US010623098B2

(12) United States Patent
Li et al.

(10) Patent No.: US 10,623,098 B2
(45) Date of Patent: Apr. 14, 2020

(54) ACCESS METHOD, APPARATUS, DEVICE, AND SYSTEM FOR VISIBLE LIGHT COMMUNICATION

(71) Applicant: HUAWEI TECHNOLOGIES CO., LTD., Shenzhen, Guangdong (CN)

(72) Inventors: Qiang Li, Beijing (CN); Tong Jiang, Beijing (CN); Chen Dong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/230,535

(22) Filed: Dec. 21, 2018

(65) Prior Publication Data

US 2019/0115978 A1    Apr. 18, 2019

Related U.S. Application Data

(63) Continuation of application No. PCT/CN2016/086938, filed on Jun. 23, 2016.

(51) Int. Cl.
*H04B 10/116* (2013.01)
*H04W 36/22* (2009.01)
(Continued)

(52) U.S. Cl.
CPC ........... *H04B 10/116* (2013.01); *H04L 43/12* (2013.01); *H04W 36/22* (2013.01); *H04W 48/16* (2013.01);
(Continued)

(58) Field of Classification Search
CPC ............. H04B 10/1149; H04B 10/116; H04B 10/1143
See application file for complete search history.

(56) References Cited

U.S. PATENT DOCUMENTS

2004/0185853 A1    9/2004  Kim et al.
2010/0111048 A1    5/2010  Shim et al.
(Continued)

FOREIGN PATENT DOCUMENTS

CN         1754329 A       3/2006
CN       101589577 A      11/2009
(Continued)

OTHER PUBLICATIONS

Machine Translation and Abstract of Chinese Publication No. CN103259592, Aug. 21, 2013, 12 pages.
(Continued)

*Primary Examiner* — Dzung D Tran
(74) *Attorney, Agent, or Firm* — Conley Rose, P.C.

(57) ABSTRACT

The present application relates to the field of communications technologies, and discloses an access method, apparatus, device, and system for visible light communication. The method includes: obtaining neighbor visible light communication personal area network VPAN information, where the neighbor VPAN information includes information about at least one neighbor VPAN of a first VPAN, and information about each neighbor VPAN includes an identity ID and probe information of the neighbor VPAN; sending the neighbor VPAN information to user equipment, where the neighbor VPAN information is used by the user equipment to perform VPAN search and access. In embodiments of the present application, a VPAN sends obtained neighbor VPAN information to user equipment, so that the user equipment can perform VPAN search and access based on probe information of a neighbor VPAN in the neighbor VPAN information.

20 Claims, 7 Drawing Sheets

(51) Int. Cl.
*H04L 12/26* (2006.01)
*H04W 48/16* (2009.01)
*H04W 88/08* (2009.01)
*H04W 84/20* (2009.01)
*H04W 8/00* (2009.01)

(52) U.S. Cl.
CPC ............ *H04W 88/08* (2013.01); *H04W 8/005* (2013.01); *H04W 84/20* (2013.01)

(56) References Cited

U.S. PATENT DOCUMENTS

| | | | |
|---|---|---|---|
| 2011/0069957 | A1 | 3/2011 | Kim et al. |
| 2012/0093517 | A1* | 4/2012 | Rajagopal ............ H04B 10/116 398/130 |
| 2013/0218769 | A1* | 8/2013 | Pourfallah ............ G06Q 20/10 705/44 |
| 2016/0119590 | A1 | 4/2016 | Ganick et al. |
| 2016/0335917 | A1* | 11/2016 | Lydecker ............ G09B 21/008 |
| 2019/0068283 | A1* | 2/2019 | Dong .................... H04W 76/11 |

FOREIGN PATENT DOCUMENTS

| | | |
|---|---|---|
| CN | 102136985 A | 7/2011 |
| CN | 103259592 A | 8/2013 |
| CN | 103441797 | 12/2013 |
| CN | 103546926 A | 1/2014 |
| CN | 103873146 A | 6/2014 |
| CN | 105530049 A | 4/2016 |
| WO | 2014085128 A1 | 6/2014 |

OTHER PUBLICATIONS

Machine Translation and Abstract of Chinese Publication No. CN103441797, Dec. 11, 2013, 10 pages.
Machine Translation and Abstract of Chinese Publication No. CN103873146, Jun. 18, 2014, 15 pages.
Machine Translation and Abstract of Chinese Publication No. CN105530049, Apr. 27, 2016, 25 pages.
Foreign Communication From a Counterpart Application, Chinese Application No. 201680068295.3, Chinese Office Action dated May 30, 2019, 6 pages.
Murat Uysal et al., "TG7r1 Channel Model Document for High-rate PD Communications," IEEE P802.5-15-0746-00-007a, Sep. 2015, pp. 1-36.
Z. Ghassemlooy et al., "Optical Wireless Communications, System and Channel Modelling with MATLAB," Jun. 15, 2012 (557 pages).
C. W. Chow et al., "Background Optical Noises Circumvention in LED Optical Wireless Systems Using OFDM," IEEE Photonics Journal (vol. 5 , Issue: 2 , Apr. 2013), Apr. 30, 2013, 10 pp.
International Search Report, dated Mar. 15, 2017, in International Application No. PCT/CN2016/086938 (5 pp.).
Written Opinion of the International Searching Authority, dated Mar. 15, 2017, in International Application No. PCT/CN2016/086938 (8 pp.).
International Search Report dated Feb. 13, 2017 in corresponding International Application No. PCT/CN2016/082803.

* cited by examiner

ACCESS METHOD, APPARATUS, DEVICE, AND SYSTEM FOR VISIBLE LIGHT COMMUNICATION

CROSS-REFERENCE TO RELATED APPLICATIONS

This application is a continuation of International Application No. PCT/CN2016/086938, filed on Jun. 23, 2016, the disclosure of which is hereby incorporated by reference in its entirety.

TECHNICAL FIELD

The present application relates to the field of communications technologies, and in particular, to an access method, apparatus, device, and system for visible light communication.

BACKGROUND

A visible light communication (VLC) technology is a technology in which communication is performed by using a visible light spectrum (380 nm to 780 nm). In the VLC communications technology, a signal is modulated at a transmit end, to obtain an optical signal of a light source (such as a light emitting diode (LED)), and the optical signal is received at a receive end by using an optical-to-electrical receiving unit, to complete high-speed signal transmission.

In VLC communication, one VLC network may include a plurality of visible light communication personal area networks (VPAN), and each VPAN is configured to serve user equipment (Device) in the VPAN. A coordinator is disposed in each VPAN. The coordinator is usually used to perform management and service transmission for the VPAN, and the coordinator may be disposed on a light source in VLC. Because a light source usually has a relatively small lighting range, in the VLC network, a VPAN also has a relatively small size, for example, a range of several square meters. A plurality of VPANs usually exist within a specific range. Coordinators in adjacent VPANs are connected by using a backhaul link, and the backhaul link may be used to implement communication between the VPANs.

When a device needs to transmit a service, the device searches for a surrounding VPAN, and is connected to a suitable VPAN for service transmission. When a VPAN is overloaded and the like, the VPAN requests a device in the VPAN to leave the VPAN. After leaving the VPAN, the device performs VPAN search again, and then selects a suitable VPAN from a found VPAN for access.

A process in which the device performs VPAN search mainly includes: receiving a beacon frame sent by a coordinator in a VPAN. Each VPAN periodically transmits the beacon frame, to ensure that the VPAN can be found by the device. However, because a plurality of VPANs usually exist within a specific range, interference between the VPANs may be relatively strong.

To resolve a problem of interference between beacon frames, the following solutions are usually used in the prior art: First, all VPANs send beacon frames by using different beacon slots; second, all VPANs send beacon frames by using different logical channels; and third, all VPANs send beacon frames by using different modulation frequencies.

Although the foregoing three solutions all can be used to resolve the problem of interference between beacon frames, because the device needs to receive the beacon frame on a plurality of beacon slots, a plurality of logical channels, or a plurality of modulation frequencies in the foregoing three solutions, the device needs to consume extremely long time to perform search. This causes extremely long access time, and consequently user experience is affected.

SUMMARY

To resolve a problem of excessive long access time during access of a device in an existing VLC technology, the present application provides an access method, apparatus, device, and system for visible light communication.

According to a first aspect, an access method for visible light communication is provided, where the method includes:

obtaining, by a coordinator, neighbor visible light communication personal area network VPAN information, where the neighbor VPAN information includes information about at least one neighbor VPAN of a first VPAN, information about each neighbor VPAN includes an identity ID and probe information of the neighbor VPAN, the probe information includes at least one of first probe information and second probe information, the first probe information is used to indicate a resource used by the neighbor VPAN to send a beacon frame, the second probe information is used to indicate whether the VPAN can be accessed by user equipment, and the first VPAN is a VPAN to which the coordinator belongs; and sending, by the coordinator, the neighbor VPAN information to the user equipment, where the neighbor VPAN information is used by the user equipment to perform VPAN search and access.

In this embodiment of the present application, the obtained neighbor VPAN information is sent to the user equipment, so that the user equipment can perform VPAN search and access based on the neighbor VPAN information. The probe information in the neighbor VPAN information may be used by the user equipment to perform VPAN search on a specified resource, or used by the user equipment to select a specified VPAN for access, or used by the user equipment to perform VPAN search on a specified resource and select a specified VPAN for access. Therefore, the user equipment may not need to perform search on all beacon slots, logical channels, or modulation frequencies, and may not need to attempt to complete access. This reduces search and access time, speeds up VPAN access of the user equipment, and improves user experience.

With reference to the first aspect, in a first possible implementation of the first aspect, the first probe information includes at least one of a beacon slot, a logical channel, and a modulation frequency, and the second probe information includes at least one of the following: whether access is allowed and load information.

In this embodiment of the present application, if the probe information includes the beacon slot, the logical channel, and the modulation frequency, the user equipment may perform search based on only the beacon slot, the logical channel, and the modulation frequency in the obtained neighbor VPAN information, so that search time can be shortened. If the probe information includes: whether access is allowed and the load information, during VPAN access, the user equipment may select a VPAN for access based on whether access is allowed, and does not send a request to a VPAN that does not allow access, so that access time can be shortened. In addition, accessing a VPAN based on load information of the VPAN avoids accessing an overloaded VPAN.

With reference to the first aspect or the first implementation of the first aspect, in a second implementation of the first aspect, the obtaining neighbor VPAN information includes:

receiving information that is about at least one neighbor VPAN of the first VPAN and that is actively reported by the user equipment in the first VPAN; or the obtaining neighbor VPAN information includes:

sending an information report instruction to the user equipment in the first VPAN; and receiving information that is about at least one neighbor VPAN of the first VPAN and that is reported by the user equipment in the first VPAN based on the information report instruction; or the obtaining neighbor VPAN information includes:

obtaining information that is about a neighbor VPAN and is sent by the neighbor VPAN.

The user equipment in the first VPAN is user equipment served by the first VPAN.

In this embodiment of the present application, the foregoing access manners are easy to implement, and can meet a requirement of a VPAN for obtaining neighbor VPAN information in the present application.

With reference to the first aspect, the first implementation of the first aspect, or the second implementation of the first aspect, in a third implementation of the first aspect, the sending the neighbor VPAN information to the user equipment includes:

sending a beacon frame to the user equipment, where the beacon frame includes the neighbor VPAN information.

In this embodiment of the present application, the neighbor VPAN information is carried in the beacon frame, so that the neighbor VPAN information can be sent to user equipment that has accessed a VPAN, and the neighbor VPAN information can also be sent to user equipment that does not access the VPAN.

With reference to the first aspect, the first implementation of the first aspect, or the second implementation of the first aspect, in a fourth implementation of the first aspect, the sending the neighbor VPAN information to the user equipment includes:

sending a neighbor VPAN status command or a disassociation command to the user equipment, where the neighbor VPAN status command or the disassociation command includes the neighbor VPAN information.

The disassociation command is used to instruct the user equipment to be disassociated from the first VPAN, and the neighbor VPAN status command is used to send the neighbor VPAN information to the user equipment.

In this embodiment of the present application, the neighbor VPAN information is sent to the user equipment by using the foregoing two commands, and this is simple and convenient, and is easy to implement.

With reference to the first aspect, the first implementation of the first aspect, or the second implementation of the first aspect, in a fifth implementation of the first aspect, the sending the neighbor VPAN information to the user equipment includes:

receiving a neighbor VPAN status request sent by the user equipment after the user equipment receives a disassociation command; and sending a neighbor VPAN status command to the user equipment, where the neighbor VPAN status command includes the neighbor VPAN information.

In this embodiment of the present application, the user equipment may actively request the neighbor VPAN information, so that in a subsequent process, if the user equipment is disassociated from a VPAN, the user equipment can conveniently search for and access a neighbor VPAN.

According to a second aspect, an access method for visible light communication is provided, where the method includes:

obtaining, by user equipment, neighbor visible light communication personal area network VPAN information, where the neighbor VPAN information includes information about at least one neighbor VPAN of a first VPAN, information about each neighbor VPAN includes an identity ID and probe information of the neighbor VPAN, the probe information includes at least one of first probe information and second probe information, the first probe information is used to indicate a resource used by the neighbor VPAN to send a beacon frame, the second probe information is used to indicate whether the VPAN can be accessed by user equipment, and the user equipment is located within coverage of the first VPAN; and performing, by the user equipment, VPAN search and access based on the neighbor VPAN information.

In this embodiment of the present application, VPAN search and access are performed based on the obtained neighbor VPAN information. The probe information in the neighbor VPAN information may be used by the user equipment to perform VPAN search on a specified resource, or used by the user equipment to select a specified VPAN for access, or used by the user equipment to perform VPAN search on a specified resource and select a specified VPAN for access. Therefore, the user equipment may not need to perform search on all beacon slots, logical channels, or modulation frequencies, and may not need to attempt to complete access. This reduces search and access time, speeds up VPAN access of the user equipment, and improves user experience.

With reference to the second aspect, in a first implementation of the second aspect, the obtaining neighbor VPAN information includes:

receiving a beacon frame sent by the first VPAN, where the beacon frame includes the neighbor VPAN information; and obtaining the neighbor VPAN information from the beacon frame.

With reference to the second aspect, in a second implementation of the second aspect, the obtaining neighbor VPAN information includes:

receiving a neighbor VPAN status command or a disassociation command that is sent by the first VPAN, where the neighbor VPAN status command or the disassociation command includes the neighbor VPAN information, and the neighbor VPAN status command is used to send the neighbor VPAN information to the user equipment; and obtaining the neighbor VPAN information from the neighbor VPAN status command or the disassociation command.

With reference to the second aspect, in a third implementation of the second aspect, the obtaining neighbor VPAN information includes:

after receiving a disassociation command, sending a neighbor VPAN status request to the first VPAN; and receiving a neighbor VPAN status command sent by the first VPAN, where the neighbor VPAN status command includes the neighbor VPAN information.

With reference to the second aspect, in a fourth possible implementation of the second aspect, the first probe information includes at least one of a beacon slot, a logical channel, and a modulation frequency, and the second probe information includes at least one of the following: whether access is allowed and load information.

With reference to the fourth implementation of the second aspect, in a fifth implementation of the second aspect, the performing VPAN search and access based on the neighbor VPAN information includes:

obtaining first probe information corresponding to all neighbor VPANs from the neighbor VPAN information;

successively searching for all the neighbor VPANs based on the first probe information corresponding to all the neighbor VPANs; and selecting a neighbor VPAN from all found neighbor VPANs for access.

In this embodiment of the present application, the user equipment may perform search based on a beacon slot, a logical channel, or a modulation frequency corresponding to a neighbor VPAN in the obtained neighbor VPAN information, so that search time is shortened.

With reference to the fifth implementation of the second aspect, in a sixth implementation of the second aspect, the selecting a neighbor VPAN from all found neighbor VPANs for access includes:

selecting, from all the found neighbor VPANs, a VPAN that allows access; and selecting, from the selected VPAN that allows access, a VPAN with lowest load for access; or selecting, based on indication information, one of all the found neighbor VPANs for access, where the indication information is triggered by a user.

In this embodiment of the present application, the user equipment may first select the VPAN that allows access, and then select the VPAN with lowest load from the VPAN that allows access. Therefore, the following case is avoided: Time is wasted because the user equipment sends an association request to another VPAN again when an association request is rejected. In addition, accessing a VPAN with relatively low load may prevent the user equipment from being disassociated again. Alternatively, the user equipment may perform access based on a user indication, to meet a user requirement.

With reference to the fourth implementation of the second aspect, in a seventh implementation of the second aspect, the performing VPAN search and access based on the neighbor VPAN information includes:

performing search on all beacon slots, logical channels, or modulation frequencies;

selecting, from all found neighbor VPANs, a VPAN that allows access; and selecting, from the selected VPAN that allows access, a VPAN with lowest load for access.

With reference to any one of the fourth to the seventh implementations of the second aspect, in an eighth implementation of the second aspect, the method further includes:

sending the neighbor VPAN information to an accessed VPAN.

According to a third aspect, an access apparatus for visible light communication is provided, where the apparatus includes several units, such as an obtaining unit and a sending unit, and the several units are configured to implement the method provided in the first aspect.

According to a fourth aspect, an access apparatus for visible light communication is provided, where the apparatus includes several units, such as an obtaining unit and a connection unit, and the several units are configured to implement the method provided in the second aspect.

According to a fifth aspect, an access device for visible light communication is provided, where the access device for visible light communication includes a processor, a memory, and a communications interface, the memory is configured to store a software program and a module, and the processor runs or executes the software program and/or the module that are/is stored in the memory, to implement the following steps:

obtaining neighbor visible light communication personal area network VPAN information, where the neighbor VPAN information includes information about at least one neighbor VPAN of a first VPAN, information about each neighbor VPAN includes an identity ID and probe information of the neighbor VPAN, the probe information includes at least one of first probe information and second probe information, the first probe information is used to indicate a resource used by the neighbor VPAN to send a beacon frame, and the second probe information is used to indicate whether the VPAN can be accessed by user equipment; and sending the neighbor VPAN information to the user equipment, where the neighbor VPAN information is used by the user equipment to perform VPAN search and access.

According to a sixth aspect, an access device for visible light communication is provided, where the access device for visible light communication includes a processor, a memory, and a communications interface, the memory is configured to store a software program and a module, and the processor runs or executes the software program and/or the module that are/is stored in the memory, to implement the following steps:

obtaining neighbor visible light communication personal area network VPAN information, where the neighbor VPAN information includes information about at least one neighbor VPAN of a first VPAN, information about each neighbor VPAN includes an identity ID and probe information of the neighbor VPAN, the probe information includes at least one of first probe information and second probe information, the first probe information is used to indicate a resource used by the neighbor VPAN to send a beacon frame, and the second probe information is used to indicate whether the VPAN can be accessed by user equipment; and performing VPAN search and access based on the neighbor VPAN information.

According to a seventh aspect, a computer readable storage medium is provided, where the computer readable storage medium is configured to store program code executed by the foregoing processor during service transmission. The program code includes an instruction used for implementing the method provided in the first aspect.

According to an eighth aspect, a computer readable storage medium is provided, where the computer readable storage medium is configured to store program code executed by the foregoing processor during service transmission. The program code includes an instruction used for implementing the method provided in the second aspect.

According to a ninth aspect, an access system for visible light communication is provided, where the system includes:

a VPAN, configured to: obtain neighbor visible light communication personal area network VPAN information, where the neighbor VPAN information includes information about at least one neighbor VPAN of the VPAN, information about each neighbor VPAN includes an identity ID and probe information of the neighbor VPAN, the probe information includes at least one of first probe information and second probe information, the first probe information is used to indicate a resource used by the neighbor VPAN to send a beacon frame, and the second probe information is used to indicate whether the VPAN can be accessed by user equipment; and send the neighbor VPAN information to the user equipment; and the user equipment, configured to: obtain the neighbor VPAN information, and perform VPAN search and access based on the neighbor VPAN information.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show only some embodiments of the present application, and a person of ordinary skill in the art may still derive other drawings from these accompanying drawings without creative efforts.

DESCRIPTION OF EMBODIMENTS

Figure 1:
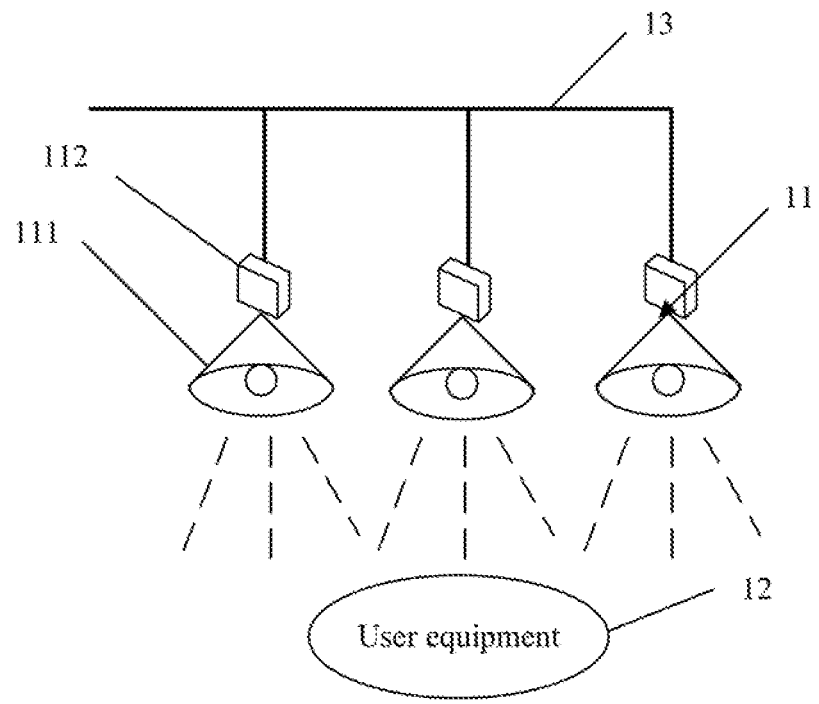
FIG. 1 is a schematic diagram of an application scenario according to an embodiment of the present application.

To make the objectives, technical solutions, and advantages of the present application clearer, the following further describes the implementations of the present application in detail with reference to the accompanying drawings.

To facilitate understanding of the technical solutions provided in the embodiments of the present application, an application scenario of the present application is first described with reference to FIG. 1.

The embodiments of the present application relate to a VLC network, and the VLC network includes a plurality of VPANs 11 and a plurality of user equipments 12. Each VPAN 11 includes a light source 111 (such as LED) and a coordinator 112, the coordinator 112 is configured to perform management and service transmission for the VPAN 11, and the coordinator 112 is usually disposed on the light source 111.

Coordinators 112 in the plurality of VPANs 11 are connected by using a backhaul link 13, to implement communication between the VPANs 11.

The user equipment 12 is a terminal that has an optical signal receiving unit, and includes a handheld device having a wireless communication function, a wearable device, a computation device, or another processing device connected to a wireless modem.

The optical signal receiving unit may be specifically a visible light receiving unit, and a main structure of the visible light receiving unit includes an optical-to-electrical converter, an analog to digital converter, and a digital signal processor that are successively electrically connected. The optical-to-electrical converter is configured to convert a visible optical signal to an electrical signal. The analog to digital converter is configured to convert the electrical signal into a digital signal. The digital signal processor is configured to process the digital signal obtained through conversion, to complete optical signal receiving.

Figure 2A:
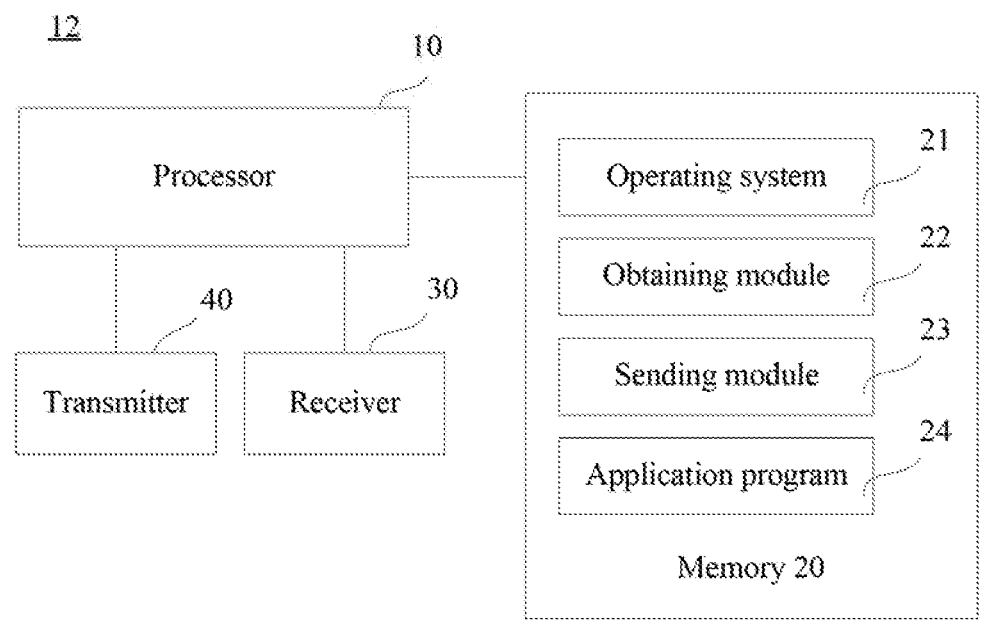
FIG. 2a is a schematic structural diagram of an access device for visible light communication according to an embodiment of the present application.

FIG. 2a is a schematic diagram of a possible hardware structure of an access device for visible light communication. The access device for visible light communication may be a coordinator in the foregoing VPAN. As shown in FIG. 2a, the access device for visible light communication includes a processor 10, a memory 20, and a communications interface 30. A person skilled in the art may understand that, the structure shown in FIG. 2a imposes no limitation on the access device for visible light communication, and the access device for visible light communication may include more or fewer components than those shown in the figure, or combine some components, or have different component arrangements.

The processor 10 is a control center of the access device for visible light communication, is connected to each part of the entire access device for visible light communication by using various interfaces and lines, and performs various functions of the access device for visible light communication and data processing by running or executing a software program and/or a module that are/is stored in the memory 20 and invoking data stored in the memory 20, to perform overall control on the access device for visible light communication. The processor 10 may be implemented by a CPU, or may be implemented by a network processor.

The memory 20 may be configured to store a software program and a module. The processor 10 runs the software program and the module that are stored in the memory 20, to perform various function applications and data processing. The memory 20 may mainly include a program storage area and a data storage area. The program storage area may store an operating system 21, an obtaining module 22, a sending module 23, an application program 24 required by at least one function (for example, a neighbor VPAN information sending program), and the like. The data storage area may store data (for example, neighbor VPAN information) created based on use of the access device for visible light communication, and the like. The memory 20 may be implemented by any type of volatile or non-volatile storage device or by a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. Correspondingly, the memory 20 may further include a memory controller, so that the processor 10 can access the memory 20.

The processor 20 performs the following function by running the obtaining module 22: obtaining neighbor visible light communication personal area network VPAN information, where the neighbor VPAN information includes information about at least one neighbor VPAN of a first VPAN, information about each neighbor VPAN includes an identity ID and probe information of the neighbor VPAN, the probe information includes at least one of first probe information and second probe information, the first probe information is used to indicate a resource used by the neighbor VPAN to send a beacon frame, and the second probe information is used to indicate whether the VPAN can be accessed by user equipment. The processor 20 performs the following function by running the sending module 23: sending the neighbor VPAN information to the user equipment by using the communications interface 30, where the neighbor VPAN information is used by the user equipment to perform VPAN search and access.

Figure 2B:
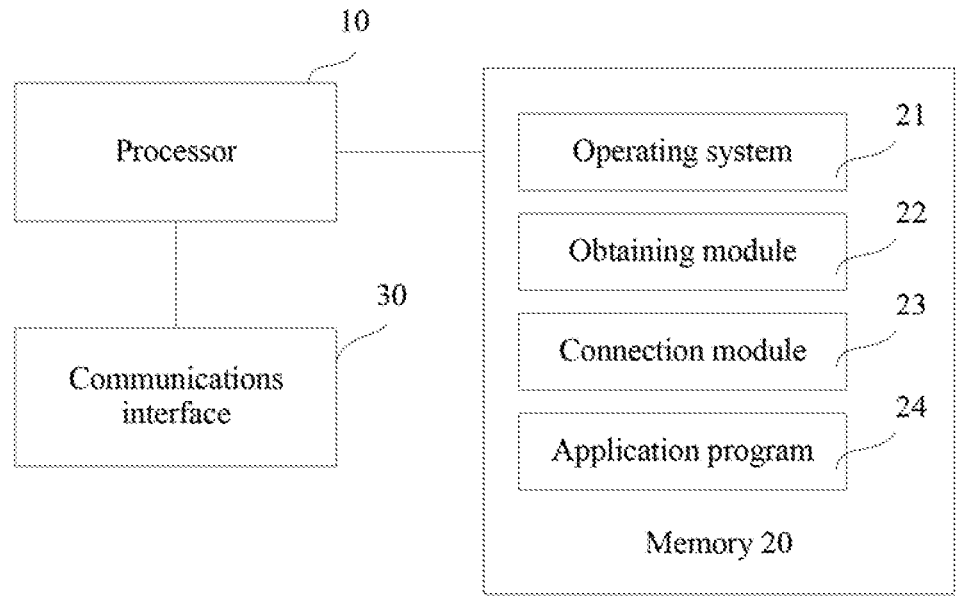
FIG. 2b is a schematic structural diagram of an access device for visible light communication according to an embodiment of the present application.

FIG. 2b is a schematic diagram of a possible hardware structure of the access device for visible light communication shown in FIG. 1. The access device for visible light communication may be the foregoing user equipment. As shown in FIG. 2b, the access device for visible light communication includes a processor 10, a memory 20, a receiver 30, and a transmitter 40. A person skilled in the art may understand that, the structure shown in FIG. 2b imposes no limitation on the access device for visible light communication, and the access device for visible light communication may include more or fewer components than those shown in the figure, or combine some components, or have different component arrangements.

The processor 10 is a control center of the access device for visible light communication, is connected to each part of the entire access device for visible light communication by using various interfaces and lines, and performs various functions of the access device for visible light communication and data processing by running or executing a software program and/or a module that are/is stored in the memory 20 and invoking data stored in the memory 20, to perform overall control on the access device for visible light communication. The processor 10 may be implemented by a CPU, or may be implemented by a network processor.

The memory 20 may be configured to store a software program and a module. The processor 10 runs the software program and the module that are stored in the memory 20, to perform various function applications and data processing. The memory 20 may mainly include a program storage area and a data storage area. The program storage area may store an operating system 21, an obtaining module 22, a connection module 23, an application program 24 required by at least one function (for example, VPAN search), and the like. The data storage area may store data (for example, neighbor VPAN information) created based on use of the access device for visible light communication, and the like. The memory 20 may be implemented by any type of volatile or non-volatile storage device or by a combination thereof, for example, a static random access memory (SRAM), an electrically erasable programmable read-only memory (English: Electrically Erasable Programmable Read-Only Memory, EEPROM for short), an erasable programmable read-only memory (EPROM), a programmable read-only memory (PROM), a read-only memory (ROM), a magnetic memory, a flash memory, a magnetic disk, or an optical disc. Correspondingly, the memory 20 may further include a memory controller, so that the processor 10 can access the memory 20.

The processor 20 performs the following function by running the obtaining module 22: obtaining neighbor visible light communication personal area network VPAN information, where the neighbor VPAN information includes information about at least one neighbor VPAN of a first VPAN, information about each neighbor VPAN includes an identity ID and probe information of the neighbor VPAN, the probe information includes at least one of first probe information and second probe information, the first probe information is used to indicate a resource used by the neighbor VPAN to send a beacon frame, and the second probe information is used to indicate whether the VPAN can be accessed by user equipment. The processor 20 performs the following function by running the connection module 23: performing VPAN search and access based on the neighbor VPAN information.

Figure 3A:
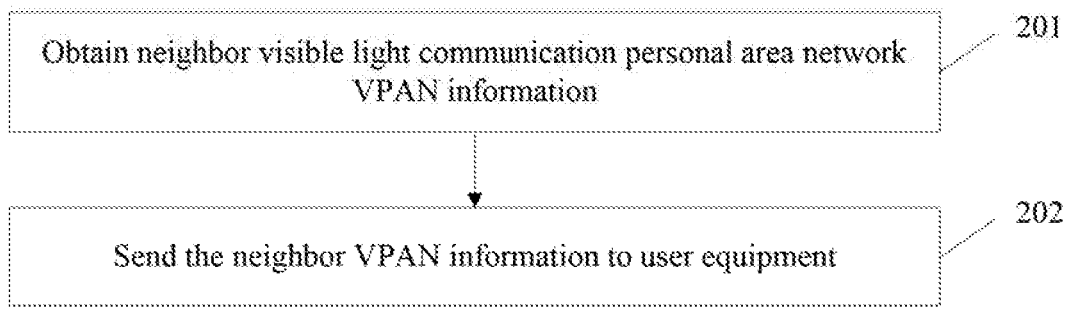
FIG. 3a is a flowchart of an access method for visible light communication according to an embodiment of the present application.

FIG. 3a is a flowchart of an access method for visible light communication according to an embodiment of the present application. The method may be executed by a coordinator in a first VPAN, and the first VPAN may be any VPAN in the foregoing application scenario. As shown in FIG. 3a, the method includes the following steps.

Step 201: Obtain neighbor visible light communication personal area network VPAN information, where the neighbor VPAN information includes information about at least one neighbor VPAN of the first VPAN, information about each neighbor VPAN includes an identity (Identity, ID for short) and probe information of the neighbor VPAN, the probe information includes at least one of first probe information and second probe information, the first probe information is used to indicate a resource used by the neighbor VPAN to send a beacon frame, and the second probe information is used to indicate whether the VPAN can be accessed by user equipment.

The first probe information includes at least one of a beacon slot, a logical channel, and a modulation frequency, and the second probe information includes at least one of the following: whether access is allowed and load information.

Further, the information about each neighbor VPAN may further include an address of the VPAN, and the address of the VPAN may be specifically an address of a coordinator in the VPAN.

The identity of the neighbor VPAN may be a combination of a number, English, a symbol, Chinese, and the like. The address of the coordinator in the neighbor VPAN may be a Media Access Control (Media Access Control, MAC for short) address.

Step 202: Send the neighbor VPAN information to the user equipment, where the neighbor VPAN information is used by the user equipment to perform VPAN search and access.

When the probe information includes the first probe information, the probe information may be used by the user equipment to perform VPAN search based on at least one of the beacon slot, the logical channel, and the modulation frequency.

When the probe information includes the second probe information, the probe information may be used by the user equipment to perform VPAN access based on at least one of the following: whether access is allowed and the load information.

In this embodiment of the present application, the obtained neighbor VPAN information is sent to the user equipment, so that the user equipment can perform VPAN search and access based on the neighbor VPAN information. The probe information in the neighbor VPAN information may be used by the user equipment to perform VPAN search on a specified resource, or used by the user equipment to select a specified VPAN for access, or used by the user equipment to perform VPAN search on a specified resource and select a specified VPAN for access. Therefore, the user equipment may not need to perform search on all beacon slots, logical channels, or modulation frequencies, and may not need to attempt to complete access. This reduces search and access time, speeds up VPAN access of the user equipment, and improves user experience.

Figure 3B:
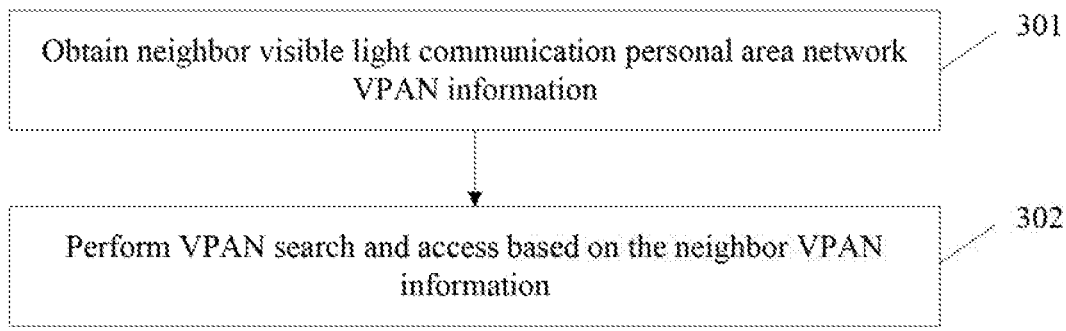
FIG. 3b is a flowchart of another access method for visible light communication according to an embodiment of the present application.

FIG. 3b is a flowchart of another access method for visible light communication according to an embodiment of the present application. The method may be executed by the user equipment in the foregoing application scenario. As shown in FIG. 3b, the method includes the following steps.

Step 301: Obtain neighbor visible light communication personal area network VPAN information, where the neighbor VPAN information includes information about at least one neighbor VPAN of a first VPAN, information about each neighbor VPAN includes an identity ID and probe information of the neighbor VPAN, the probe information includes at least one of first probe information and second probe information, the first probe information is used to indicate a resource used by the neighbor VPAN to send a beacon frame, the second probe information is used to indicate whether the VPAN can be accessed by user equipment, and the user equipment is located within coverage of the first VPAN.

The first probe information includes at least one of a beacon slot, a logical channel, and a modulation frequency, and the second probe information includes at least one of the following: whether access is allowed and load information.

Further, the information about each neighbor VPAN may further include an address of the VPAN, and the address of the VPAN may be specifically an address of a coordinator in the VPAN.

The identity of the neighbor VPAN may be a combination of a number, English, a symbol, Chinese, and the like. The address of the coordinator in the neighbor VPAN may be a MAC address.

Step 302: Perform VPAN search and access based on the neighbor VPAN information.

When the probe information includes the first probe information, the user equipment may perform VPAN search based on at least one of the beacon slot, the logical channel, and the modulation frequency.

When the probe information includes the second probe information, the user equipment may perform VPAN access based on at least one of the following: whether access is allowed and the load information.

In this embodiment of the present application, VPAN search and access are performed based on the obtained neighbor VPAN information. The probe information in the neighbor VPAN information may be used by the user equipment to perform VPAN search on a specified resource, or used by the user equipment to select a specified VPAN for access, or used by the user equipment to perform VPAN search on a specified resource and select a specified VPAN for access. Therefore, the user equipment may not need to perform search on all beacon slots, logical channels, or modulation frequencies, and may not need to attempt to complete access. This reduces search and access time, speeds up VPAN access of the user equipment, and improves user experience.

Figure 4:
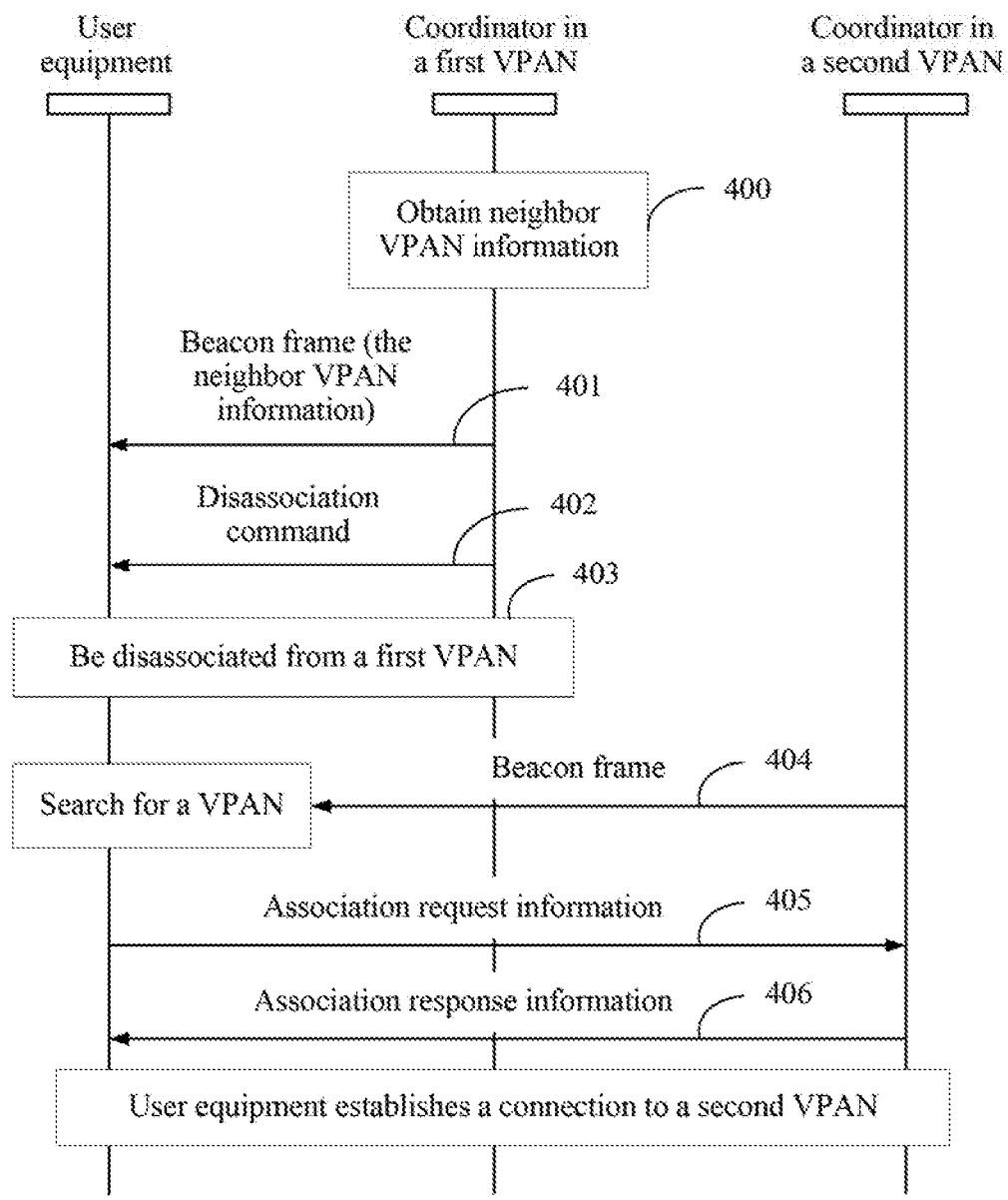
FIG. 4 is a flowchart of another access method for visible light communication according to an embodiment of the present application.

FIG. 4 is a flowchart of another access method for visible light communication according to an embodiment of the present application. The method may be executed by a coordinator and user equipment in a first VPAN. The first VPAN may be any VPAN in the foregoing application scenario, and the user equipment is the user equipment in the foregoing application scenario. In the method provided in FIG. 4, the coordinator in the first VPAN sends neighbor VPAN information to the user equipment by using a beacon frame. As shown in FIG. 4, the method includes the following steps.

Step 400: The coordinator in the first VPAN obtains neighbor VPAN information.

The neighbor VPAN information includes neighbor VPAN information. The neighbor VPAN information includes information about at least one neighbor VPAN of the first VPAN. Information about each neighbor VPAN includes an identity ID and probe information of the neighbor VPAN. The probe information includes at least one of first probe information and second probe information. The first probe information is used to indicate a resource used by the neighbor VPAN to send a beacon frame. The second probe information is used to indicate whether the VPAN can be accessed by user equipment.

The first probe information includes at least one of a beacon slot, a logical channel, and a modulation frequency, and the second probe information includes at least one of the following: whether access is allowed and load information.

The beacon slot is time occupied by a plurality of beacon slots (location) obtained by dividing time occupied by a beacon area (such as a superframe (Superframe)), and different VPANs may send beacon frames by using different beacon slots.

The logical channel is a channel that includes light with different wavelengths, for example, a channel including light whose wavelength is 300 nm to 400 nm is referred to as a logical channel 1, and a channel including light whose wavelength is 400 nm to 500 nm is referred to as a logical channel 2.

The modulation frequency is a frequency of a carrier that carries a beacon frame. For example, a VPAN 1 uses a modulation frequency of 0 MHz to 5 MHz, a VPAN 2 uses a modulation frequency of 5 MHz to 10 MHz, and a VPAN 3 uses a modulation frequency of 10 MHz to 15 MHz.

Further, the information about each neighbor VPAN may further include an address of the VPAN, and the address of the VPAN may be specifically an address of a coordinator in the VPAN.

The identity of the neighbor VPAN may be a combination of a number, English, a symbol, Chinese, and the like. The address of the coordinator in the neighbor VPAN may be a MAC address.

In this embodiment of the present application, that the coordinator in the first VPAN obtains neighbor VPAN information includes but is not limited to the following manners:

Manner 1: The coordinator in the first VPAN receives neighbor VPAN information that is actively reported by the user equipment in the first VPAN. The coordinator may receive neighbor VPAN information that is actively reported by a plurality of user equipments, and then combine the neighbor VPAN information that is actively reported by the plurality of user equipments. A purpose of the combination is mainly to delete same information in the plurality of pieces of neighbor VPAN information and then store the neighbor VPAN information.

Because the user equipment may receive beacon frames from a plurality of VPANs before the user equipment accesses the first VPAN, and the beacon frames carry information about corresponding VPANs, after accessing the first VPAN, the user equipment may send the information about the neighbor VPANs to the first VPAN. Certainly, the user equipment may obtain, by accessing another VPAN, information that may not be carried in a beacon frame, for example, whether access is allowed.

Manner 2: The coordinator in the first VPAN sends an information report instruction to the user equipment in the first VPAN.

The coordinator in the first VPAN receives neighbor VPAN information that is reported by the user equipment in the first VPAN based on the information report instruction.

Specifically, the coordinator in the first VPAN may send the information report instruction to the user equipment after the user equipment accesses the first VPAN.

Manner 3: The coordinator in the first VPAN obtains information that is about a neighbor VPAN and is sent by the neighbor VPAN. As described above, a backhaul link is disposed between VPANs for mutual communication, and therefore the neighbor VPAN may send the information about the neighbor VPAN to the first VPAN by using the backhaul link.

Step 401: The coordinator in the first VPAN sends a beacon frame to the user equipment, where the beacon frame includes the neighbor VPAN information.

Further, the beacon frame further includes information about the first VPAN, and the information about the first VPAN may include information such as an ID of the VPAN, a MAC address of the coordinator in the VPAN, and configuration of a superframe.

A new field may be added in the beacon frame to carry the neighbor VPAN information.

In step 401, the neighbor VPAN information is carried in the beacon frame, so that the neighbor VPAN information can be sent to user equipment that has accessed a VPAN, and the neighbor VPAN information can also be sent to user equipment that does not access the VPAN.

Step 402: The coordinator in the first VPAN sends a disassociation command to the user equipment.

In some scenarios (for example, the first VPAN is overloaded), the coordinator in the first VPAN sends the disassociation command to the user equipment, to disassociate the user equipment from the first VPAN, thereby reducing load of the first VPAN. The first VPAN may select, in the following manners, user equipment that needs to be disassociated: sending the disassociation command to low-priority user equipment based on a priority of user equipment; or sending the disassociation command to user equipment with long access time based on access time of user equipment; or randomly selecting user equipment and then sending the disassociation command to the selected user equipment.

Specifically, the disassociation command may be a disassociation command frame.

Step 403: After receiving the disassociation command, the user equipment is disassociated from the first VPAN.

Step 402 and step 403 are optional steps. If the user equipment currently has not accessed the first VPAN, step 402 and step 403 do not need to be performed. Instead, step 404 is directly performed after step 401.

Step 404: The user equipment performs VPAN search by using the neighbor VPAN information.

In step 404, if the user equipment is disassociated from the first VPAN, the user equipment can immediately perform VPAN search directly by using the neighbor VPAN information. If the user equipment does not access the first VPAN before, when a result of determining whether to access the first VPAN is that the user equipment does not access the first VPAN, the user equipment may perform VPAN search by using the neighbor VPAN information.

Specifically, when the probe information includes the first probe information, step 404 may include the following steps:

The user equipment obtains first probe information corresponding to all neighbor VPANs from the neighbor VPAN information; and the user equipment successively searches for all the neighbor VPANs based on the first probe information corresponding to all the neighbor VPANs.

The user equipment may perform search based on a beacon slot, a logical channel, or a modulation frequency corresponding to a neighbor VPAN in the obtained neighbor VPAN information, and does not need to perform search on all beacon slots, logical channels, or modulation frequencies. Therefore, the user equipment is prevented from performing search on a beacon slot, a logical channel, or a modulation frequency that is not used by the neighbor VPAN, so that search time is shortened.

When the probe information does not include the first probe information, step 404 may include the following step:

The user equipment performs search on all beacon slots, logical channels, or modulation frequencies. All the beacon slots, logical channels, or modulation frequencies may be beacon slots, logical channels, or modulation frequencies that can be used by VPANs in a conventional VLC technology.

Step 405: The user equipment sends association request information to a second VPAN.

The second VPAN is a VPAN selected by the user equipment based on the neighbor VPAN information.

Specifically, that the user equipment selects a VPAN for access includes the following steps:

The user equipment selects, from all found neighbor VPANs, a VPAN that allows access; and the user equipment selects, from the selected VPAN that allows access, a VPAN with lowest load for access; or the user equipment selects, based on indication information, one of all the found neighbor VPANs for access, where the indication information is triggered by a user.

In this step, the user equipment may first select the VPAN that allows access, and then select the VPAN with lowest load from the VPAN that allows access. Therefore, the following case is avoided: Time is wasted because the user equipment sends an association request to another VPAN again when an association request is rejected. In addition, accessing a VPAN with relatively low load may prevent the user equipment from being disassociated again. Alternatively, the user equipment may perform access based on a user indication, to meet a user requirement.

Further, if the user equipment does not access the first VPAN before, the user equipment may also select the first VPAN for access in step 405.

The association request information may be an association request frame.

Step 406: A coordinator in the second VPAN sends association response information to the user equipment.

The association response information may be an association response frame.

In step 406, the user equipment accesses the second VPAN. After accessing the second VPAN, the user equipment may send the neighbor VPAN information to the second VPAN, and the neighbor VPAN information herein may include the information about the first VPAN.

Further, if the second VPAN in step 405 is selected based on the indication information, the second VPAN may send association reject information to the user equipment after the user equipment sends the association request. In this case, the user equipment needs to select a new VPAN again and send association request information to the new VPAN until the user equipment accesses a VPAN.

Figure 5:
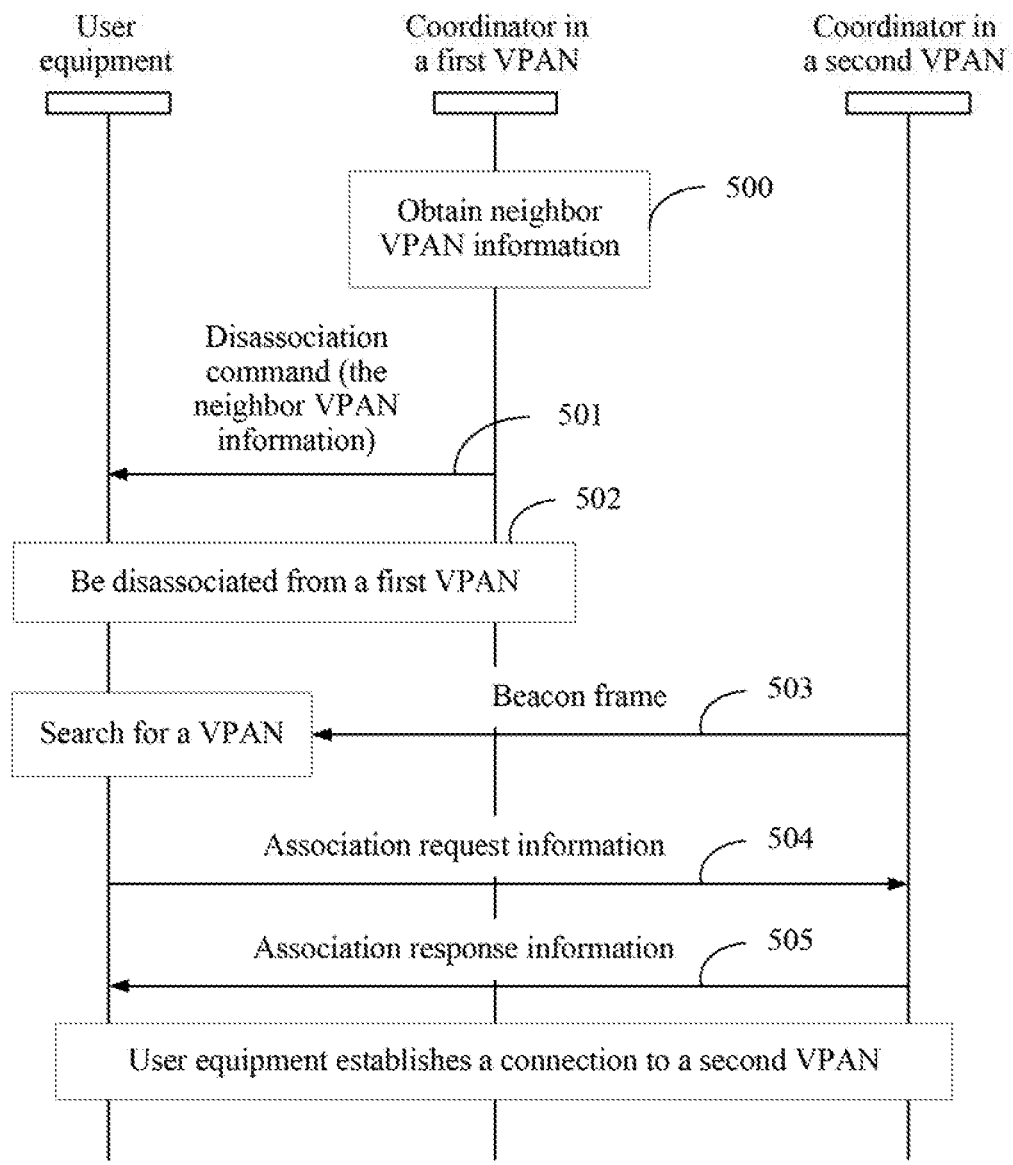
FIG. 5 is a flowchart of another access method for visible light communication according to an embodiment of the present application.

FIG. 5 is a flowchart of another access method for visible light communication according to an embodiment of the present application. The method may be executed by a coordinator and user equipment in a first VPAN. The first VPAN may be any VPAN in the foregoing application scenario, and the user equipment is the user equipment in the foregoing application scenario. In the method provided in FIG. 5, the coordinator in the first VPAN sends neighbor VPAN information to the user equipment by using a disassociation command. As shown in FIG. 5, the method includes the following steps.

Step 500: The coordinator in the first VPAN obtains neighbor VPAN information.

For specific content of the neighbor VPAN information and how to obtain the neighbor VPAN information, refer to step 400. Detailed description is omitted herein.

Step 501: The coordinator in the first VPAN sends a disassociation command to the user equipment, where the disassociation command includes the neighbor VPAN information.

In some scenarios (for example, the first VPAN is overloaded), the first VPAN sends the disassociation command to the user equipment, to disassociate the user equipment from the first VPAN, thereby reducing load of the first VPAN. The first VPAN may select, in the following manners, user equipment that needs to be disassociated: sending the disassociation command to low-priority user equipment based on a priority of user equipment; or sending the disassociation command to user equipment with long access time based on access time of user equipment; or randomly selecting user equipment and then sending the disassociation command to the selected user equipment.

Specifically, the disassociation command may be a disassociation command frame. A new field may be added in the disassociation command frame to carry the neighbor VPAN information.

Step 502: After receiving the disassociation command, the user equipment is disassociated from the first VPAN.

Step 503: The user equipment performs VPAN search by using the neighbor VPAN information.

A specific process of this step is the same as that of step 404, and details are not described herein again.

Step 504: The user equipment sends association request information to a second VPAN.

A specific process of this step is the same as that of step 405, and details are not described herein again.

Step 505: A coordinator in the second VPAN sends association response information to the user equipment.

A specific process of this step is the same as that of step 406, and details are not described herein again.

Figure 6:
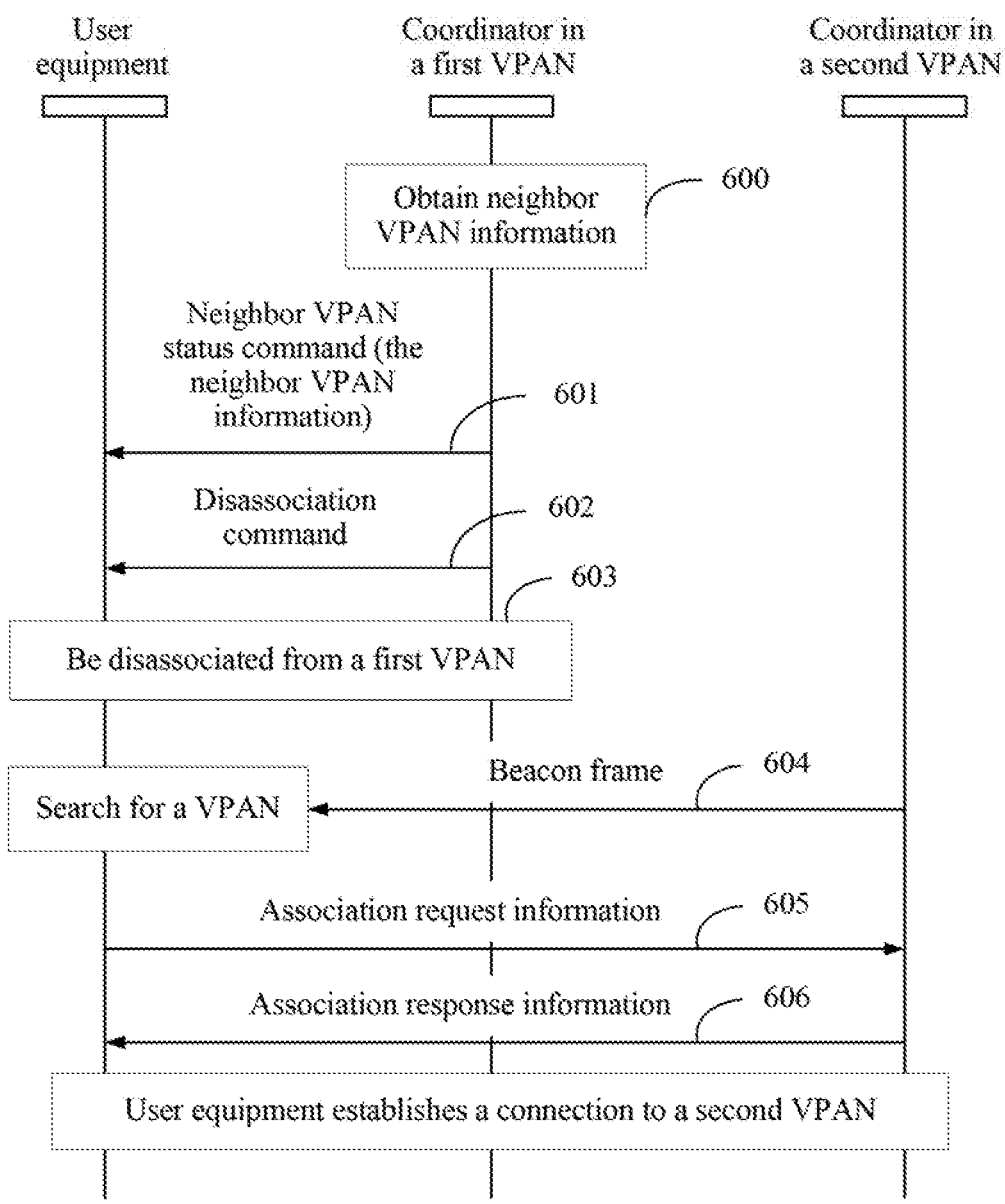
FIG. 6 is a flowchart of another access method for visible light communication according to an embodiment of the present application.

FIG. 6 is a flowchart of another access method for visible light communication according to an embodiment of the present application. The method may be executed by a coordinator and user equipment in a first VPAN. The first VPAN may be any VPAN in the foregoing application scenario, and the user equipment is the user equipment in the foregoing application scenario. In the method provided in FIG. 6, the coordinator in the first VPAN sends neighbor VPAN information to the user equipment by using a neighbor VPAN status command. As shown in FIG. 6, the method includes the following steps.

Step 600: The coordinator in the first VPAN obtains neighbor VPAN information.

For specific content of the neighbor VPAN information and how to obtain the neighbor VPAN information, refer to step 400. Detailed description is omitted herein.

Step 601: The first VPAN sends a neighbor VPAN status command to the user equipment, where the neighbor VPAN status command includes the neighbor VPAN information.

The neighbor VPAN status command may be a neighbor VPAN status indication command frame.

Specifically, the neighbor VPAN status indication command frame is a new frame added in a VPAN communication protocol, and is used by a VPAN to send neighbor VPAN information to user equipment.

Step 602: The coordinator in the first VPAN sends a disassociation command to the user equipment, where the disassociation command includes the neighbor VPAN information.

A specific process of this step is the same as that of step 402, and details are not described herein again.

Step 603: After receiving the disassociation command, the user equipment is disassociated from the first VPAN.

Step 604: The user equipment performs VPAN search by using the neighbor VPAN information.

A specific process of this step is the same as that of step 404, and details are not described herein again.

Step 605: The user equipment sends association request information to a second VPAN.

A specific process of this step is the same as that of step 405, and details are not described herein again.

Step 606: A coordinator in the second VPAN sends association response information to the user equipment.

A specific process of this step is the same as that of step 406, and details are not described herein again.

Figure 7:
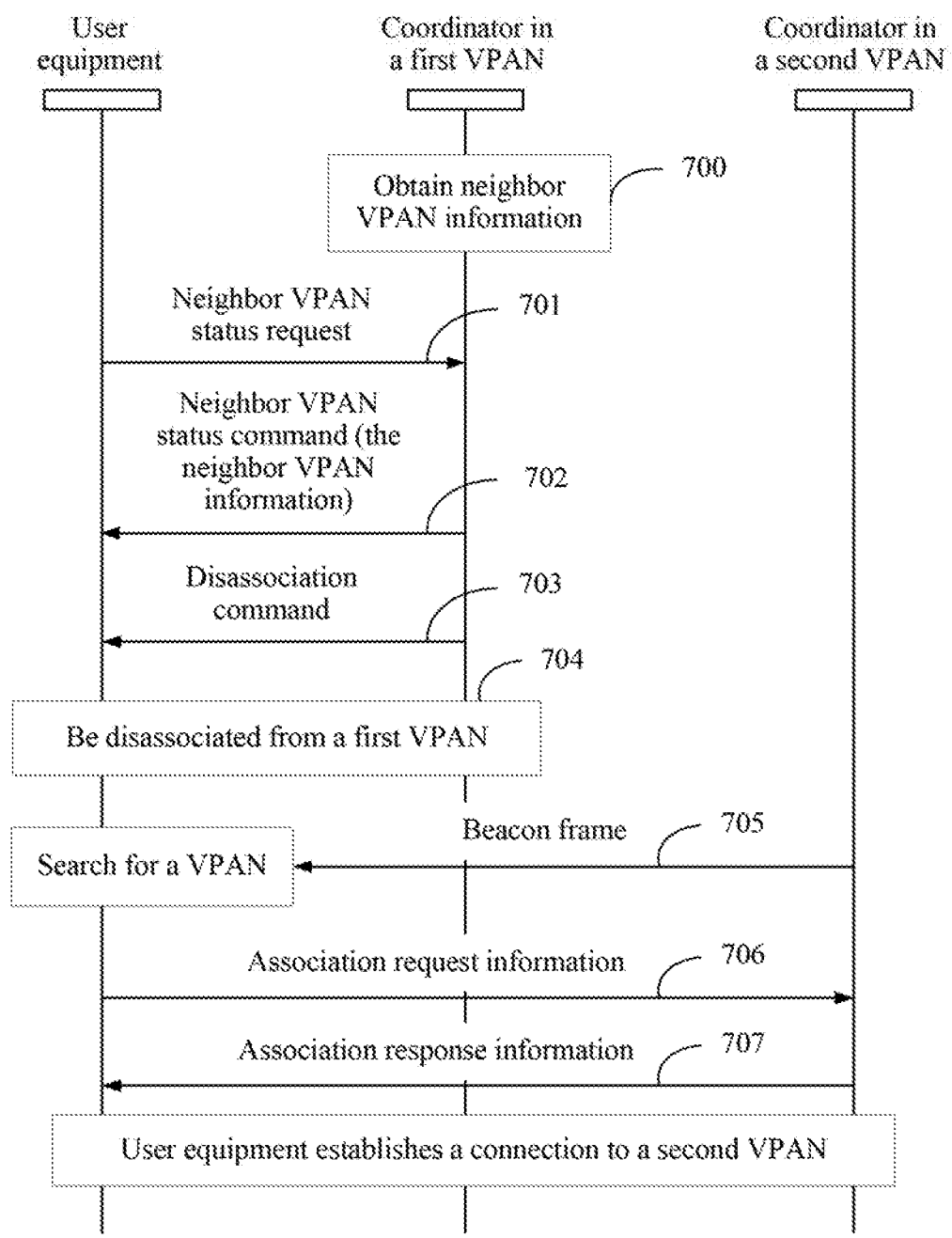
FIG. 7 is a flowchart of another access method for visible light communication according to an embodiment of the present application.

FIG. 7 is a flowchart of another access method for visible light communication according to an embodiment of the present application. The method may be executed by a coordinator and user equipment in a first VPAN. The first VPAN may be any VPAN in the foregoing application scenario, and the user equipment is the user equipment in the foregoing application scenario. In the method provided in FIG. 7, after receiving a neighbor VPAN status request from the user equipment, the coordinator in the first VPAN sends neighbor VPAN information to the user equipment by using a neighbor VPAN status command. As shown in FIG. 7, the method includes the following steps.

Step 700: The coordinator in the first VPAN obtains neighbor VPAN information.

For specific content of the neighbor VPAN information and how to obtain the neighbor VPAN information, refer to step 400. Detailed description is omitted herein.

Step 701: The user equipment sends a neighbor VPAN status request to the first VPAN.

The neighbor VPAN status request may be a neighbor VPAN status request frame.

Specifically, the neighbor VPAN status request frame is a new frame added in a VPAN communication protocol, and is used by user equipment to request neighbor VPAN information from a VPAN.

Step 702: The coordinator in the first VPAN sends a neighbor VPAN status command to the user equipment, where the neighbor VPAN status command includes the neighbor VPAN information.

Specifically, a neighbor VPAN status indication command frame is a new frame added in the VPAN communication protocol, and is used by a VPAN to send neighbor VPAN information to user equipment.

Step 703: The coordinator in the first VPAN sends a disassociation command to the user equipment, where the disassociation command includes the neighbor VPAN information.

A specific process of this step is the same as that of step 402, and details are not described herein again.

Step 704: After receiving the disassociation command, the user equipment is disassociated from the first VPAN.

Step 705: The user equipment performs VPAN search by using the neighbor VPAN information.

A specific process of this step is the same as that of step 404, and details are not described herein again.

Step 706: The user equipment sends association request information to a second VPAN.

A specific process of this step is the same as that of step 405, and details are not described herein again.

Step 707: A coordinator in the second VPAN sends association response information to the user equipment.

A specific process of this step is the same as that of step 406, and details are not described herein again.

Figure 8:
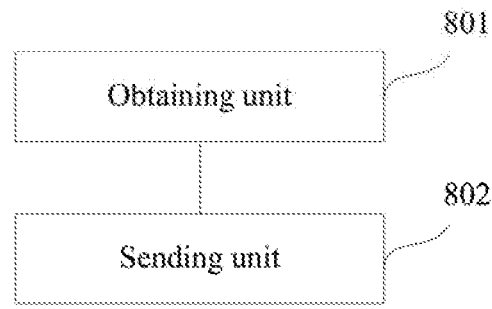
FIG. 8 is a schematic structural diagram of an access apparatus for visible light communication according to an embodiment of the present application.

FIG. 8 is a block diagram of an access apparatus for visible light communication according to an embodiment of the present application. The access apparatus for visible light communication may be implemented, by using software, hardware, or a combination of software and hardware, as all or a part of the access device for visible light communication shown in FIG. 2a. The access apparatus for visible light communication may implement steps performed by a VPAN in the access method for visible light communication provided in any one of FIG. 3a or FIG. 4 to FIG. 7. The access apparatus for visible light communication may include an obtaining unit 801 and a sending unit 802.

The obtaining unit 801 is configured to obtain neighbor visible light communication personal area network VPAN information, where the neighbor VPAN information includes information about at least one neighbor VPAN of a first VPAN, information about each neighbor VPAN includes an identity ID and probe information of the neighbor VPAN, the probe information includes at least one of first probe information and second probe information, the first probe information is used to indicate a resource used by the neighbor VPAN to send a beacon frame, and the second probe information is used to indicate whether the VPAN can be accessed by user equipment.

The sending unit 802 is configured to send the neighbor VPAN information to the user equipment, where the neighbor VPAN information is used by the user equipment to perform VPAN search and access.

Optionally, the first probe information includes at least one of a beacon slot, a logical channel, and a modulation frequency, and the second probe information includes at least one of the following: whether access is allowed and load information.

Optionally, the obtaining unit 801 is configured to:
receive information that is about at least one neighbor VPAN of the first VPAN and that is actively reported by the user equipment in the first VPAN; or
the obtaining unit 801 is configured to:
send an information report instruction to the user equipment in the first VPAN; and receive information that is about at least one neighbor VPAN of the first VPAN and that is reported by the user equipment in the first VPAN based on the information report instruction; or
the obtaining unit 801 is configured to:
obtain information that is about a neighbor VPAN and is sent by the neighbor VPAN.

Optionally, the sending unit 802 is configured to:
send a beacon frame to the user equipment, where the beacon frame includes the neighbor VPAN information.

Optionally, the sending unit 802 is configured to:
send a neighbor VPAN status command or a disassociation command to the user equipment, where the neighbor VPAN status command or the disassociation command includes the neighbor VPAN information, and the disassociation command is used to instruct the user equipment to be disassociated from the first VPAN.

Optionally, the sending unit 802 is configured to:
receive a neighbor VPAN status request sent by the user equipment after the user equipment receives a disassociation command; and
send a neighbor VPAN status command to the user equipment, where the neighbor VPAN status command includes the neighbor VPAN information.

Figure 9:
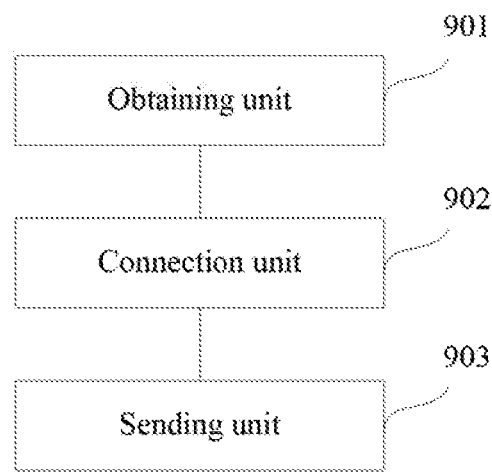
FIG. 9 is a schematic structural diagram of another access apparatus for visible light communication according to an embodiment of the present application.

FIG. 9 is a block diagram of another access apparatus for visible light communication according to an embodiment of the present application. The access apparatus for visible light communication may be implemented, by using software, hardware, or a combination of software and hardware, as all or a part of the access device for visible light communication shown in FIG. 2b. The access apparatus for visible light communication may implement steps performed by user equipment in the access method for visible light communication provided in any one of FIG. 3b or FIG. 4 to FIG. 7. The access apparatus for visible light communication may include an obtaining unit 901 and a connection unit 902.

The obtaining unit 901 is configured to obtain neighbor visible light communication personal area network VPAN information, where the neighbor VPAN information includes information about at least one neighbor VPAN of a first VPAN, information about each neighbor VPAN includes an identity ID and probe information of the neighbor VPAN, the probe information includes at least one of first probe information and second probe information, the first probe information is used to indicate a resource used by the neighbor VPAN to send a beacon frame, and the second probe information is used to indicate whether the VPAN can be accessed by user equipment.

The connection unit 902 is configured to perform VPAN search and access based on the neighbor VPAN information.

Optionally, the obtaining unit 901 is configured to:
receive a beacon frame sent by the first VPAN, where the beacon frame includes the neighbor VPAN information; and
obtain the neighbor VPAN information from the beacon frame.

Optionally, the obtaining unit 901 is configured to:
receive a neighbor VPAN status command or a disassociation command that is sent by the first VPAN, where the neighbor VPAN status command or the disassociation command includes the neighbor VPAN information, and the disassociation command is used to instruct the user equipment to be disassociated from the first VPAN; and
obtain the neighbor VPAN information from the neighbor VPAN status command or the disassociation command.

Optionally, the obtaining unit 901 is configured to:
after receiving a disassociation command, send a neighbor VPAN status request to the first VPAN; and receive a neighbor VPAN status command sent by the first VPAN, where the neighbor VPAN status command includes the neighbor VPAN information.

Optionally, the first probe information includes at least one of a beacon slot, a logical channel, and a modulation frequency, and the second probe information includes at least one of the following: whether access is allowed and load information.

Optionally, the connection unit 902 is configured to:

obtain first probe information corresponding to all neighbor VPANs from the neighbor VPAN information;

successively search for all the neighbor VPANs based on the first probe information corresponding to all the neighbor VPANs; and select a neighbor VPAN from all found neighbor VPANs for access.

Optionally, the connection unit 902 is configured to:

select, from all the found neighbor VPANs, a VPAN that allows access; and select, from the selected VPAN that allows access, a VPAN with lowest load for access; or select, based on indication information, one of all the found neighbor VPANs for access, where the indication information is triggered by a user.

Optionally, the connection unit 902 is configured to:

perform search on all beacon slots, logical channels, or modulation frequencies;

select, from all found neighbor VPANs, a VPAN that allows access; and select, from the selected VPAN that allows access, a VPAN with lowest load for access.

Optionally, the apparatus further includes:

a sending unit 903, configured to send the neighbor VPAN information to an accessed VPAN.

Figure 10:
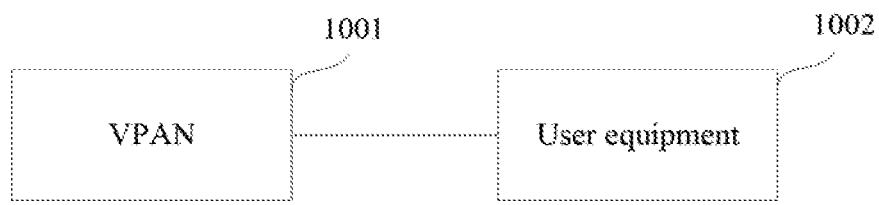
FIG. 10 is a schematic structural diagram of an access system for visible light communication according to an embodiment of the present application.

FIG. 10 is a block diagram of an access system for visible light communication according to an embodiment of the present application. Referring to FIG. 10, the system includes a VPAN 1001 and user equipment 1002.

The VPAN 1001 is configured to: obtain neighbor visible light communication personal area network VPAN information, where the neighbor VPAN information includes information about at least one neighbor VPAN of the VPAN 1001, and information about each neighbor VPAN includes an identity ID and probe information of the neighbor VPAN; and send neighbor VPAN information to the user equipment.

The user equipment 1002 is configured to: obtain the neighbor VPAN information, and perform VPAN search and access based on the neighbor VPAN information.

The VPAN 1001 may implement steps performed by a coordinator in a VPAN in the access method for visible light communication provided in any one of FIG. 3a or FIG. 4 to FIG. 7. The user equipment 1002 may implement steps performed by user equipment in the access method for visible light communication provided in any one of FIG. 3b or FIG. 4 to FIG. 7.

It should be noted that, when the access apparatus for visible light communication provided in the foregoing embodiments performs VPAN search and access, division of the foregoing function units is only an example for description. In actual application, the foregoing functions may be allocated to different function units for implementation as required, that is, an inner structure of a device is divided into different function units to implement all or some of the functions described above. In addition, the access apparatus for visible light communication provided in the foregoing embodiments pertains to a same concept as the embodiment of the access method for visible light communication. For a specific implementation process of the apparatus, refer to the method embodiment. Details are not described herein.

A person of ordinary skill in the art may understand that all or some steps of the embodiments may be implemented by hardware or a program instructing related hardware. The program may be stored in a computer readable storage medium. The storage medium may be a read-only memory, a magnetic disk, an optical disc, or the like.

The foregoing descriptions are only examples of the embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. An access method for visible light communication, comprising:
    obtaining neighbor visible light communication personal area network (VPAN) information, wherein the neighbor VPAN information comprises information about a neighbor VPAN of a first VPAN, wherein the neighbor VPAN information comprises an identity of the neighbor VPAN and probe information of the neighbor VPAN, wherein the probe information comprises at least one of first probe information or second probe information, wherein the first probe information indicates a resource used by the neighbor VPAN to send a beacon frame, wherein the second probe information indicates whether the neighbor VPAN is accessible by user equipment, and wherein the user equipment is located within coverage of the first VPAN; and
    performing a VPAN search and access based on the neighbor VPAN information.

2. The access method of claim 1, wherein obtaining the neighbor VPAN information comprises:
    receiving a beacon frame from the first VPAN; and
    obtaining the neighbor VPAN information from the beacon frame, wherein the beacon frame comprises the neighbor VPAN information.

3. The access method of claim 1, wherein obtaining the neighbor VPAN information comprises:
    receiving a neighbor VPAN status command or a neighbor VPAN disassociation command from the first VPAN, wherein the neighbor VPAN status command enables the first VPAN to send the neighbor VPAN information to the user equipment; and
    obtaining the neighbor VPAN information from the neighbor VPAN status command or the neighbor VPAN disassociation command, wherein the neighbor VPAN status command or the neighbor VPAN disassociation command comprises the neighbor VPAN information.

4. The access method of claim 1, wherein obtaining the neighbor VPAN information comprises:
    sending a neighbor VPAN status request to the first VPAN after receiving a neighbor VPAN disassociation command; and
    receiving a neighbor VPAN status command from the first VPAN, wherein the neighbor VPAN status command comprises the neighbor VPAN information.

5. The access method of claim 1, wherein the first probe information comprises at least one of a beacon slot, a logical channel, or a modulation frequency, and wherein the second probe information comprises at least one of information on whether access is allowed or load information.

6. The access method of claim 5, wherein performing the VPAN search and access based on the neighbor VPAN information comprises:
obtaining first probe information corresponding to all neighbor VPANs from the neighbor VPAN information;
successively searching all the neighbor VPANs based on the first probe information corresponding to all the neighbor VPANs; and
selecting the neighbor VPAN from all found neighbor VPANs for access.

7. The access method of claim 6, wherein selecting the neighbor VPAN from all the found neighbor VPANs for access comprises:
selecting, from all the found neighbor VPANs, a VPAN that allows access to obtain a selected VPAN; and
either selecting, from the selected VPAN, a VPAN with lowest load for access; or
selecting, based on indication information, one of all the found neighbor VPANs for access, wherein the indication information is triggered by a user.

8. The access method of claim 5, wherein performing the VPAN search and access based on the neighbor VPAN information comprises:
searching all beacon slots, logical channels, or modulation frequencies;
selecting, from all found neighbor VPANs, a VPAN that allows access to obtain a selected VPAN; and
selecting, from the selected VPAN, a VPAN with lowest load for access.

9. The access method of claim 1, wherein the access method further comprises sending the neighbor VPAN information to an accessed VPAN.

10. An access device for visible light communication, comprising:
a memory configured to store a software program code;
a communications interface coupled to the memory; and
a processor coupled to the memory and the communications interface, wherein the processor is configured to execute the software program code to cause the access device to be configured to:
obtain neighbor visible light communication personal area network (VPAN) information, wherein the neighbor VPAN information comprises information about a neighbor VPAN of a first VPAN, wherein the neighbor VPAN information comprises an identity of the neighbor VPAN and probe information of the neighbor VPAN, wherein the probe information comprises at least one of first probe information or second probe information, wherein the first probe information indicates a resource used by the neighbor VPAN to send a beacon frame, and wherein the second probe information indicates whether the neighbor VPAN is accessible by user equipment; and
perform a VPAN search and access based on the neighbor VPAN information.

11. The access device of claim 10, wherein the software program code further causes the access device to be configured to:
receive a beacon frame from the first VPAN; and
obtain the neighbor VPAN information from the beacon frame, wherein the beacon frame comprises the neighbor VPAN information.

12. The access device of claim 10, wherein the software program code further causes the access device to be configured to:
receive a neighbor VPAN status command or a neighbor VPAN disassociation command from the first VPAN, wherein the neighbor VPAN status command enables the first VPAN to send the neighbor VPAN information to the user equipment; and
obtain the neighbor VPAN information from the neighbor VPAN status command or the neighbor VPAN disassociation command, wherein the neighbor VPAN status command or the neighbor VPAN disassociation command comprises the neighbor VPAN information.

13. The access device of claim 10, wherein the software program code further causes the access device to be configured to:
send a neighbor VPAN status request to the first VPAN after receiving a neighbor VPAN disassociation command; and
receive a neighbor VPAN status command from the first VPAN, wherein the neighbor VPAN status command comprises the neighbor VPAN information.

14. The access device of claim 10, wherein the first probe information comprises at least one of a beacon slot, a logical channel, or a modulation frequency, and wherein the second probe information comprises at least one of information on whether access is allowed or load information.

15. The access device of claim 14, wherein the software program code further causes the access device to be configured to:
obtain first probe information corresponding to all neighbor VPANs from the neighbor VPAN information;
successively search all the neighbor VPANs based on the first probe information corresponding to all the neighbor VPANs; and
select the neighbor VPAN from all found neighbor VPANs for access.

16. The access device according to claim 15, wherein the software program code further causes the access device to be configured to:
select, from all the found neighbor VPANs, a VPAN that allows access to obtain a selected VPAN; and
either select, from the selected VPAN, a VPAN with lowest load for access; or
select, based on indication information, one of all the found neighbor VPANs for access, wherein the indication information is triggered by a user.

17. The access device of claim 14, wherein the software program code further causes the access device to be configured to:
search all beacon slots, logical channels, or modulation frequencies;
select, from all found neighbor VPANs, a VPAN that allows access to obtain a selected VPAN; and
select, from the selected VPAN, a VPAN with lowest load for access.

18. The access device of claim 10, wherein the software program code further causes the access device to be configured to send the neighbor VPAN information to an accessed VPAN.

19. The access device of claim 10, wherein the access device is the user equipment or a component of the user equipment.

20. An access system for visible light communication, comprising:
a visible light communication personal area network (VPAN) comprising an access apparatus, wherein the access apparatus comprises a processor and a memory coupled to the processor, wherein the processor is configured to cause the VPAN network to obtain neighbor VPAN information, wherein the neighbor VPAN information comprises information about a neighbor VPAN of the VPAN, wherein the neighbor VPAN information comprises an identity of the neighbor VPAN and probe information of the neighbor VPAN, wherein the probe information comprises at least one of first probe information or second probe information, wherein the first probe information indicates a resource used by the neighbor VPAN to send a beacon frame, and wherein the second probe information indicates whether the neighbor VPAN is accessible by user equipment; and user equipment coupled to the VPAN and configured to:
  obtain the neighbor VPAN information from the VPAN; and
  perform VPAN search and access based on the neighbor VPAN information.

\* \* \* \* \*